United States Patent [19]

Itoh et al.

[11] Patent Number: 5,006,708
[45] Date of Patent: Apr. 9, 1991

[54] METHOD FOR GENERATING RADIATION IMAGE SIGNALS

[75] Inventors: Wataru Itoh; Nobuyoshi Nakajima; Takefumi Nagata, all of Kanagawa, Japan

[73] Assignee: Fuji Photo Film Co., Ltd., Kanagawa, Japan

[21] Appl. No.: 407,823

[22] Filed: Sep. 15, 1989

[30] Foreign Application Priority Data

Sep. 16, 1988 [JP] Japan ........................... 63-231845
Apr. 6, 1989 [JP] Japan ........................... 1-87708

[51] Int. Cl.$^5$ .................... G01N 23/04; G03B 42/02
[52] U.S. Cl. ................................ 250/327.2; 382/31
[58] Field of Search .............. 250/327.2 G, 327.2 D, 250/484.1 B, 550; 382/31, 42; 364/413.26; 358/454

[56] References Cited

U.S. PATENT DOCUMENTS

| | | |
|---|---|---|
| 4,258,264 | 3/1981 | Kotera et al. . |
| 4,276,473 | 6/1981 | Kato et al. . |
| 4,282,511 | 8/1981 | Southgate et al. ............ 250/550 |
| 4,315,318 | 2/1982 | Kato et al. . |
| 4,387,428 | 6/1983 | Ishida et al. . |
| 4,801,795 | 1/1989 | Wilwerding ................... 250/550 |

FOREIGN PATENT DOCUMENTS 56-11395 2/1981 Japan .
61-5193 2/1986 Japan .

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image which has been recorded on a recording medium is read out at predetermined sampling intervals in order to obtain an image signal. A method for generating a radiation image signal comprises the steps of, in the course of the radiation image being read out, first applying sampling intervals corresponding to a second spatial frequency fsw higher than a first spatial frequency fss, which is the maximum of a desired spatial frequency range, along at least one direction on the recording medium in order to obtain an original image signal. The original image signal is then subjected to filtering processing in order to transmit spatial frequency components below the first spatial frequency fss, and to reduce or eliminate spatial frequency components above the first spatial frequency fss. Lastly, the original image signal which has been obtained from the filtering processing is sampled at sampling intervals corresponding to the first spatial frequency fss in order to obtain an image signal.

6 Claims, 6 Drawing Sheets

METHOD FOR GENERATING RADIATION IMAGE SIGNALS

BACKGROUND OF THE INVENTION

1. Field of the Invention

This invention relates to a method for generating a radiation image signal from a recording medium which has a radiation image recorded thereon.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed for the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318, 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used to reproduce the radiation image of the object as a visible image on a recording material such as photographic film, a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density, regardless of the energy intensity of the radiation to which the stimulable phosphor sheet was exposed. In order to obtain the desired image density, an appropriate read-out gain is set when the emitted light is being detected, and converted into an electric signal to be used in the reproduction of a visible image on a recording material or a display device.

In general, in radiation image read-out apparatuses, wherein an image signal is detected from a recording medium such as an X-ray film or a stimulable phosphor sheet which has a radiation image recorded thereon, light which is emitted from the recording medium and which carries information about the radiation image is photoelectrically detected and converted into an image signal. The image signal is then sampled at sampling intervals of $\Delta x = \frac{1}{2} fss$, which intervals correspond to the maximum spatial frequency (maximum Nyquist spatial frequency) necessary for image information. The maximum Nyquist spatial frequency necessary for image information is herein denoted by fss. The sampled image signal is digitized. The image signal obtained in this manner includes not only the information representing the radiation image but also noise which renders the radiation image rough. Most of the noise is quantum noise which is caused by the sway of quanta of radiation irradiated to the recording medium during the recording of the radiation image and the sway of light emitted from the recording medium during the readout of the radiation image.

The image signal including the quantum noise is fed into an image processing apparatus which processes the image signal in order to minimize quantum noise. However, the image quality of a radiation image is defined by not only the level of quantum noise but also contrast and sharpness. Quantum noise is incompatible with contrast and sharpness. Therefore, when the image signal is processed in order to reduce quantum noise, contrast and sharpness deteriorate to some extent. When the image signal is processed in order to improve contrast and sharpness, quantum noise increases. Accordingly, the image quality of the radiation image compromises between quantum noise and contrast, sharpness or the like.

In order to improve image quality of a radiation image further, it is necessary to reduce the quantum noise of the original image signal. One approach to reduce the quantum noise is to increase the radiation dose to an object during the recording of a radiation image. However, for the sake of safety or other factors, the radiation dose cannot be increased to a great degree.

SUMMARY OF THE INVENTION

The primary object of the present invention is to provide a method for generating a radiation image signal which includes little quantum noise.

Another object of the present invention is to provide a method for generating a radiation image signal, which enables a visible radiation image having good image quality to be reproduced.

The present invention provides a method for generating a radiation image signal wherein a radiation image which has been recorded on a recording medium is read out at predetermined sampling intervals in order to obtain an image signal, the method for generating a radiation image signal comprising the steps of:

(i) in the course of said radiation image being read out, applying sampling intervals corresponding to a second spatial frequency fsw higher than a first spatial frequency fss, which is the maximum of a desired spatial frequency range, along at least one direction on said recording medium in order to obtain an original image signal, (ii) subjecting said original image signal to a filtering processing in order to transmit spatial frequency components below said first spatial frequency fss, and to reduce or eliminate spatial frequency components above said first spatial frequency fss, and (iii) sampling the original image signal, which has been obtained from said filtering processing, at sampling intervals corresponding to said first spatial frequency fss in order to obtain an image signal.

In a preferred embodiment of the method for generating a radiation image signal in accordance with the present invention, in cases where $|R(f)|$ denotes the absolute value of a complex response function $R(f)$ wherein a spatial frequency f is a variable, and the complex response function $R(f)$ is normalized so that it satisfies the condition expressed as $$|R(0)| = 1 \quad (1)$$

when $f=0$, the complex response function $R(f)$ satisfying the condition expressed as $$\overline{R} \leq 0.6$$

wherein $\overline{R}0$ denotes a response mean value expressed as $$R = \frac{\int_{fss}^{fsw} |R(f)| df}{\int_{fss}^{fsw} df} \quad (2)$$

is used in order to carry out said filtering processing along at least one said direction.

In the method for generating a radiation image signal in accordance with the present invention, sampling of the image signal at sampling intervals corresponding to the first spatial frequency fss may be carried out after the filtering processing has been carried out. Alternatively, operations may be carried out so that both the sampling of the image signal at sampling intervals corresponding to the first spatial frequency fss and the filtering processing are effected simultaneously.

Also, the method for generating a radiation image signal in accordance with the present invention may be applied along only a single predetermined direction on the recording medium. Good effects can be obtained when the method for generating a radiation image signal in accordance with the present invention is applied along only one predetermined direction on the recording medium, while no processing is carried out along the other direction. However, for example, processing wherein an analog filter is used may be applied to image signal components corresponding to positions along said other direction on the recording medium. Alternatively, the method for generating a radiation image signal in accordance with the present invention may be applied along two directions over the whole area of the recording medium.

The inventors analyzed quantum noise, and found that quantum noise has many components in the spatial frequency region above the spatial frequency fss, which is the maximum of a spatial frequency range necessary for image information. The present invention is based on the findings.

It is generally known that, when an analog signal which represents information in the frequency regions above and below a predetermined frequency fc is sampled at sampling intervals $\Delta x = \frac{1}{2}fc$ corresponding to the frequency fc and digitized, the digital signal thus obtained comprises frequency components below the frequency fc, but includes frequency components above the frequency fc, which components constitute noise. Such noise is referred to as area zing.

With the method for generating a radiation image signal in accordance with the present invention, a radiation image is read out at sampling intervals $\Delta x = \frac{1}{2}fsw$ corresponding to a second spatial frequency fsw higher than a first Nyquist spatial frequency fss, which is the maximum of a desired spatial frequency range, in order to obtain an original image signal. The original image signal is subjected to filtering processing in order to reduce or eliminate spatial frequency components above the first spatial frequency fss from the original image signal. Therefore, it is possible to obtain an image signal which includes no or few quantum noise components falling in the spatial frequency region above the first spatial frequency fss. The image signal thus obtained can be processed so that a visible image having good image quality is reproduced from the processed image signal.

The original image signal, which has been obtained from the filtering processing, is sampled at sampling intervals $\Delta x = \frac{1}{2}fss$ corresponding to the first spatial frequency fss in order to obtain an image signal. Therefore, it is necessary to employ a buffer storage device having a somewhat large capacity in order to store temporarily the original image signal. However, the capacity of a storage device which stores a plurality of image signals sampled from a plurality of original image signals representing different radiation images can be kept small. Also, the time required to send the image signal to an image processing and reproducing apparatus or the like can be kept short.

Also, in cases where the complex response function $R(f)$ satisfying the condition expressed as $$\overline{R} \leq 0.6 \quad (3)$$

wherein $\overline{R}$, denoting a response mean value calculated from Formula (2), is used in order to carry out filtering processing along at least one said direction, it is possible to obtain an image signal which is substantially free of quantum noise components falling in the spatial frequency region above the first spatial frequency fss. Therefore, a visible image having good image quality is reproduced from the image signal.

DESCRIPTION OF THE PREFERRED EMBODIMENTS

The present invention will hereinbelow be described in further detail with reference to the accompanying drawings.

Figure 1:
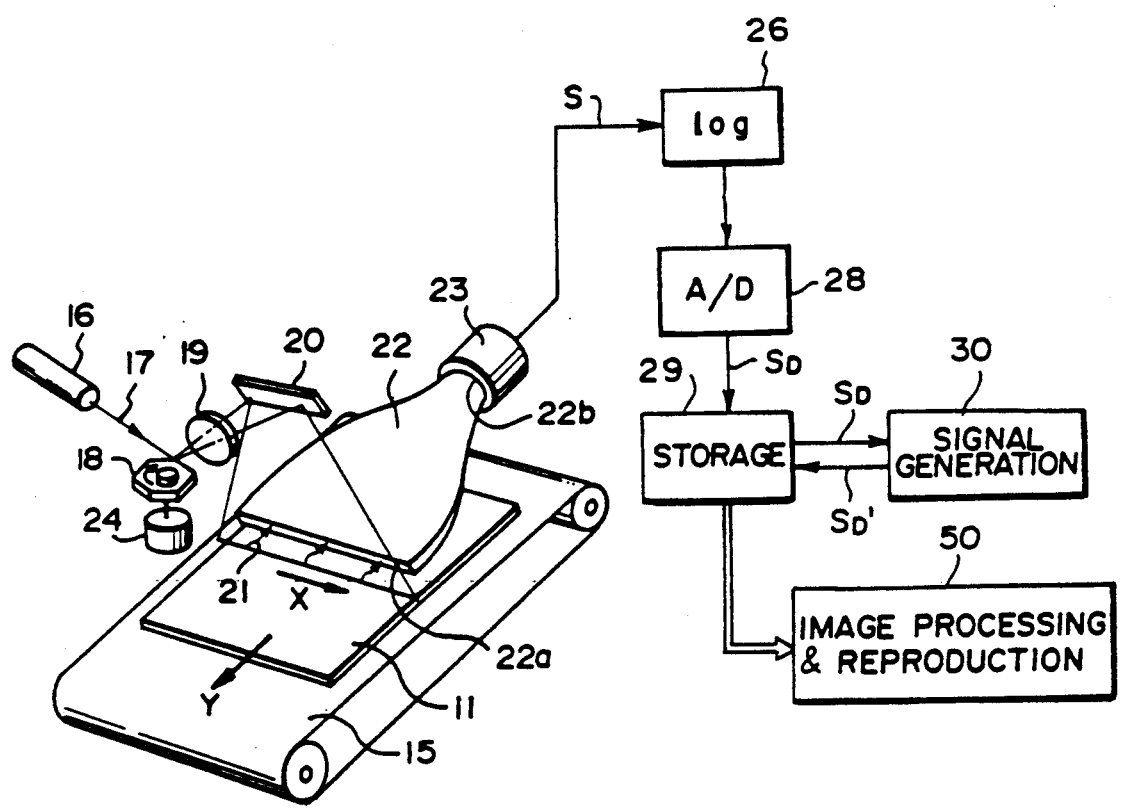
FIG. 1 is a perspective view showing an example of a radiation image read-out and reproducing apparatus wherein an embodiment of the method for generating a radiation image signal in accordance with the present invention is employed.

With reference to FIG. 1, a radiation image read-out and reproducing apparatus, wherein an embodiment of the method for generating a radiation image signal in accordance with the present invention is employed, utilizes a stimulable phosphor sheet.

A stimulable phosphor sheet 11, on which a radiation image has been stored, is placed at a predetermined position in the radiation image read-out and reproducing apparatus. The stimulable phosphor sheet 11 is conveyed in a sub-scanning direction indicated by the arrow Y by a sheet conveyance means 15, which is constituted of an endless belt or the like and which is operated by an operating means (not shown). A laser beam 17 produced by a laser beam source 16 is reflected and deflected by a rotating polygon mirror 18, which is quickly rotated by a motor 24 in the direction indicated by the arrow, and then passes through a converging lens 19 constituted of an f$\theta$ lens or the like. The direction of the optical path of the laser beam 17 is then changed by a mirror 20, and the laser beam 17 impinges upon the stimulable phosphor sheet 11 and scans it in a main scanning direction indicated by the arrow X, whose direction is approximately normal to the sub-scanning direction indicated by the arrow Y. When the stimulable phosphor sheet 11 is exposed to the laser beam 17, the exposed portion of the stimulable phosphor sheet 11 emits light 21 in an amount proportional to the amount of energy stored thereon during exposure to radiation. The emitted light 21 is guided by a light guide member 22, and photoelectrically detected by a photomultiplier 23. The light guide member 22 is made from a light guiding material such as an acrylic plate, and has a linear light input face 22a positioned so that it extends along the main scanning line on the stimulable phosphor sheet 11, and a ring-shaped light output face 22b positioned so that it is in close contact with a light receiving face of the photomultiplier 23. The emitted light 21, which has entered the light guide member 22 from its light input face 22a, is guided through repeated total reflection inside of the light guide member 22, emanates from the light output face 22b, and is received by the photomultiplier 23. In this manner, the amount of the emitted light 21 carrying the radiation image is converted into an electric signal by the photomultiplier 23.

An analog output signal S generated by the photomultiplier 23 includes signal components falling in the spatial frequency region above the first spatial frequency fss which is the maximum of a desired spatial frequency range necessary for reproduction of a visible radiation image having good image quality. The signal components falling in the spatial frequency region above the first spatial frequency fss constitute quantum noise and must be eliminated.

The analog output signal S is logarithmically amplified by a logarithmic amplifier 26. The amplified analog output signal S is then sampled at predetermined sampling intervals and digitized by an A/D converter 28. In this manner, a digital image signal SD (initial image signal) is obtained. The original image signal SD is stored in a storage means 29.

Figure 2:
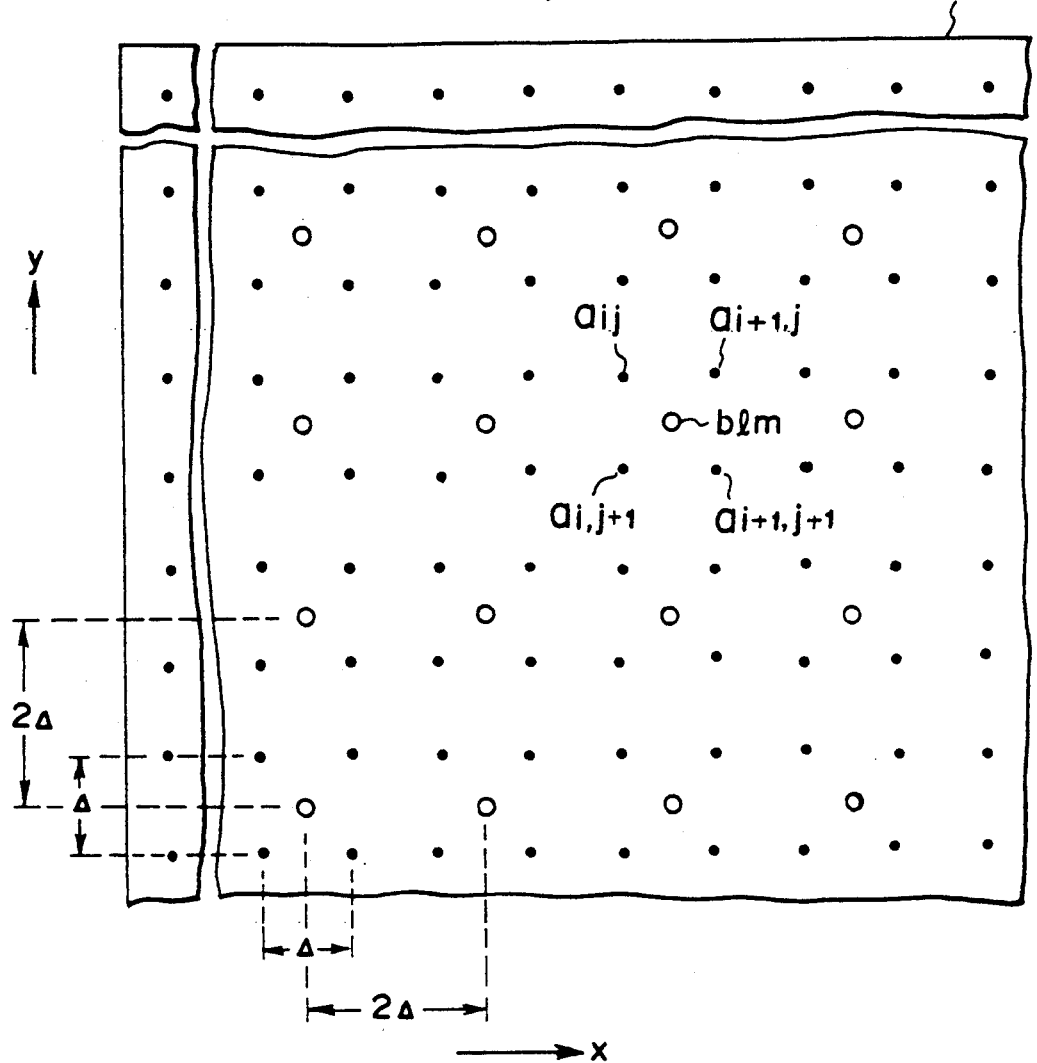
FIG. 2 is an explanatory view showing sampling points located on a stimulable phosphor sheet in order to explain how an example of filtering processing is carried out.

FIG. 2 shows sampling points located on the stimulable phosphor sheet 11. In FIG. 2, the horizontal direction (x direction) corresponds to the main scanning direction indicated by the arrow X in FIG. 1, and the vertical direction (y direction) corresponds to the sub-scanning direction indicated by the arrow Y in FIG. 1. Dots represent the sampling points from which the original image signal SD is sampled. Circles represent the sampling points at which an image signal is resampled from the original image signal SD. In this embodiment, in order to obtain the original image signal SD, the amplified analog output signal S is sampled at sampling intervals of $\Delta = \frac{1}{2}$fsw corresponding to a second spatial frequency fsw, which is two times as high as a first spatial frequency fss necessary to read out the radiation image recorded on the stimulable phosphor sheet, along both the x direction (main scanning direction) and the y direction (sub-scanning direction). The sampling intervals of $\Delta = \frac{1}{2}$fsw are one-half of the sampling intervals of $2\cdot\Delta = \frac{1}{2}$fss corresponding to the first spatial frequency fss. In order to set the sampling intervals along the x direction (main scanning direction), for example, the sampling time intervals in the A/D converter 28 shown in FIG. 1 are adjusted. In order to set the sampling intervals along the y direction (sub-scanning direction), for example, the speed at which the stimulable phosphor sheet 11 is moved by the sheet conveyance means 15 shown in FIG. 1 is adjusted.

The original image signal SD sampled from the amplified analog output signal S at the sampling points indicated by the dots in FIG. 2 is stored in the storage means 29 shown in FIG. 1, and is fed therefrom into an image signal generating means 30. The image signal generating means 30 carries out filtering processing and resampling processing in the manner described below. Resampling processing is carried out in order to sample an image signal at sampling intervals of $2\cdot\Delta = \frac{1}{2}$fss corresponding to the first spatial frequency fss.

In FIG. 2, aij, ai+1,j, ... (i,j=1, 2, ...) denote values of the original image signal SD at respective sampling points. From the values aij, ai+1,j,... (i,j=1, 2, ...), values blm (l,m=1, 2, ...) of the image signal after being resampled are calculated from the formula expressed as $$blm = \tfrac{1}{4}(aij + ai+1,j + ai,j+1 + ai+1,j+1) \quad (4)$$

The calculation from Formula (4) is carried out for the original image signal SD representing the image information stored over the whole surface of the stimulable phosphor sheet 11. In this manner, filtering processing (which will be described later) and resampling processing (wherein the number of the sampling points is reduced to one-half in both the x and y directions) are carried out simultaneously.

Figure 3:
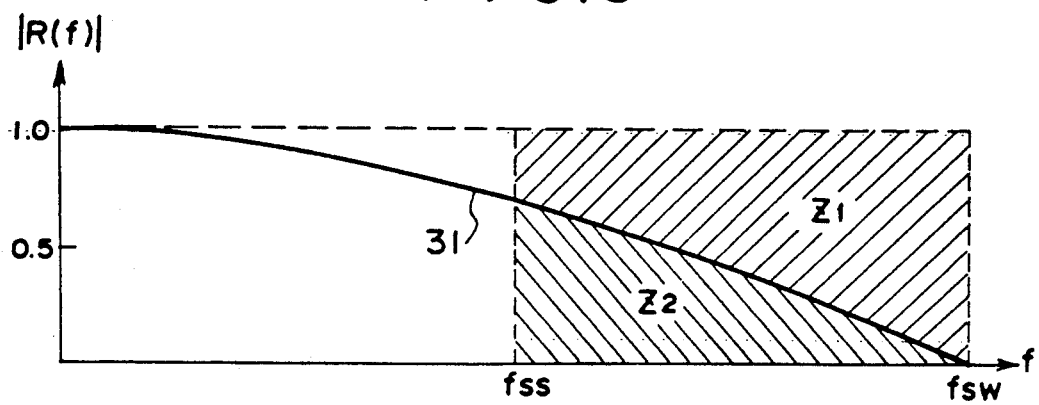
FIG. 3 is an explanatory view showing an example of a filter.

FIG. 3 shows the filter effects of Formula (4) In FIG. 3, the spatial frequency f is plotted on the horizontal axis, and the absolute value $|R(f)|$ of the complex response function R(f), which is normalized so that the absolute value is 1 when f=0, is plotted on the vertical axis.

With reference to FIG. 3, curve 31 represents the filter effects of Formula (4) along the x direction shown in FIG. 2. (The same effects are obtained along the y direction shown in FIG. 2). Based on the areas of hatched zones z1 and z2, a response mean value $\overline{R0}$ along the x direction (or along the y direction) is calculated from the formula expressed as (area of z2)/(area of z1 + area of z2).

Specifically, the response mean value $\overline{R0}$ along the x direction (or along the y direction) is calculated from the formula expressed as $$R = \frac{\int_{fss}^{fsw} |R(f)| df}{\int_{fss}^{fsw} df} \quad (5)$$

$$= 0.37$$

As will be described later, when Formula (4) is used to carry out the filtering processing and resampling processing, a visible image having a markedly improved image quality can be obtained.

Figure 4:
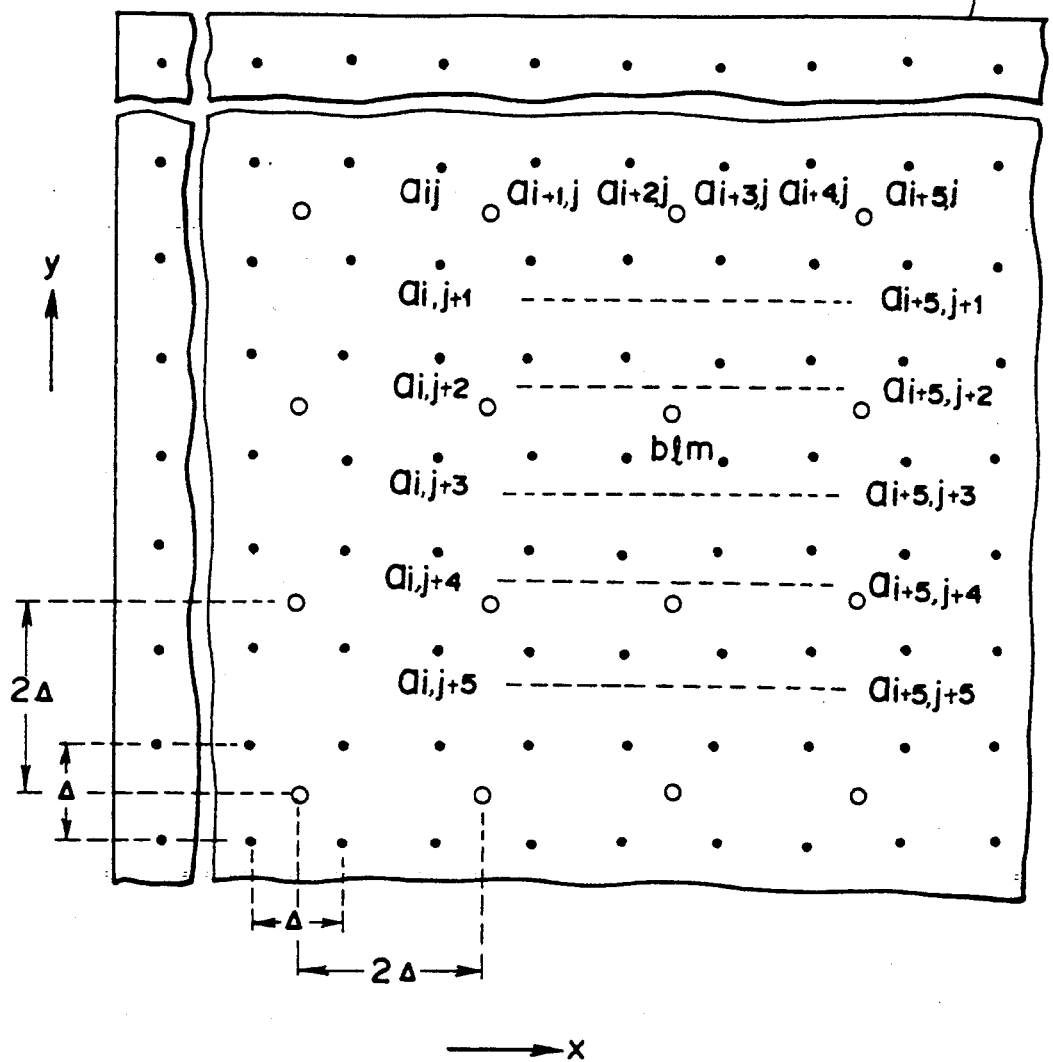
FIG. 4 is an explanatory view showing sampling points located on a stimulable phosphor sheet in order to explain how another example of filtering processing is carried out.

FIG. 4 shows sampling points located on the stimulable phosphor sheet 11 in order to explain how another example of filtering processing is carried out. In FIG. 4, dots represent the sampling points from which the original image signal SD is sampled. Circles represent the sampling points at which an image signal is resampled from the original image signal SD.

In this embodiment, from values aij, ai+1,j,... (i,j=1, 2, ...) of the original image signal SD at respective sampling points, values blm (l,m=1, 2, ...) of the image signal after being resampled are calculated from the formula expressed as $$blm = \frac{1}{400} \times (4 \cdot a_{ij} - 6 \cdot a_{i+1,j} - 18 \cdot a_{i+2,j} - 18 \cdot a_{i+3,j} - 6 \quad (6)$$

$$a_{i+4,j} + 4 \cdot a_{i+5,j} - 6 \cdot a_{i,j+1} + 9 \cdot a_{i+1,j+1} + 27 \cdot a_{i+2,j+1} +$$

$$27 \cdot a_{i+3,j+1} + 9 \cdot a_{i+4,j+1} - 6 \cdot a_{i+5,j+1} - 18 \cdot a_{i,j+2} +$$

$$27 \cdot a_{i+1,j+2} + 81 \cdot a_{i+2,j+2} + 81 \cdot a_{i+3,j+2} + 27 \cdot a_{i+4,j+2} -$$

$$18 \cdot a_{i+5,j+2} - 18 \cdot a_{i,j+3} + 27 \cdot a_{i+1,j+3} + 81 \cdot a_{i+2,j+3} +$$

$$81 \cdot a_{i+3,j+3} + 27 \cdot a_{i+4,j+3} - 18 \cdot a_{i+5,j+3} - 6 \cdot a_{i,j+4} +$$

$$9 \cdot a_{i+1,j+4} + 27 \cdot a_{i+2,j+4} + 27 \cdot a_{i+3,j+4} + 9 \cdot a_{i+4,j+4} -$$

$$6 \cdot a_{i+5,j+4} + 4 \cdot a_{i,j+5} - 6 \cdot a_{i+1,j+5} - 18 \cdot a_{i+2,j+5} -$$

-continued
$$18 \cdot a_{i+3,j+5} - 6 \cdot a_{i+4,j+5} + 4 \cdot a_{i+5,j+5})$$

The calculation from Formula (6) is carried out for the original image signal SD representing the image information stored over the whole surface of the stimulable phosphor sheet 11. In this manner, the filtering and resampling processing are carried out simultaneously.

Figure 5:
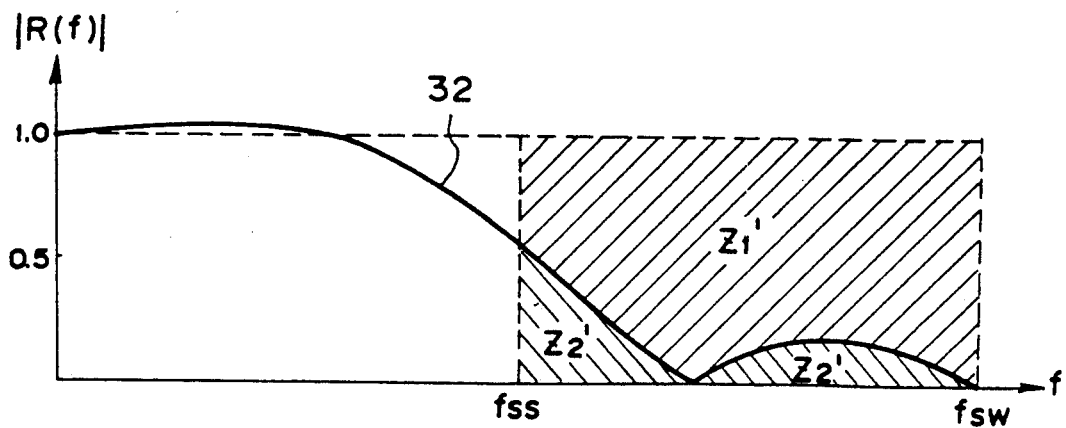
FIG. 5 is an explanatory view showing another example of a filter.

FIG. 5 shows the filter effects of Formula (6) In FIG. 5, the spatial frequency f is plotted on the horizontal axis, and the absolute value $|R(f)|$ of the complex response function R(f), which is normalized so that the absolute value is 1 when f=0, is plotted on the vertical axis.

With reference to FIG. 5, curve 32 represents the filter effects of Formula (6) along the x direction shown in FIG. 4. (The same effects are obtained along the y direction shown in FIG. 4). A response mean value $\overline{R0}$ along the x direction is calculated from the formula expressed as $$R = (\text{area of } z2')/(\text{area of } z1' + \text{area of } z2') \quad (7)$$

$$= \frac{\int_{fss}^{fsw} |R(f)| df}{\int_{fss}^{fsw} df}$$

$$= 0.22$$

As will be described later, when Formula (6) is used to carry out the filtering and resampling processing a visible image having better image quality than when Formula (4) is used can be obtained.

In the manner described above, the image signal generating means 30, shown in FIG. 1, reduces the quantum noise components included in the original image signal SD and resamples the original image signal SD at the sampling intervals corresponding to the first spatial frequency fss in order to obtain an image signal SD'. The image signal SD' is stored in the storage means 29, and is then fed therefrom into an image processing and reproducing apparatus 50. The image processing and reproducing apparatus 50 carries out the appropriate image processing of the image signal SD' and reproduces a visible image from the image signal SD'. Because the image signal SD' includes little quantum noise, a visible image having good image quality, high contrast and sharpness, for example, can be reproduced from the image signal SD'.

Figure 6:
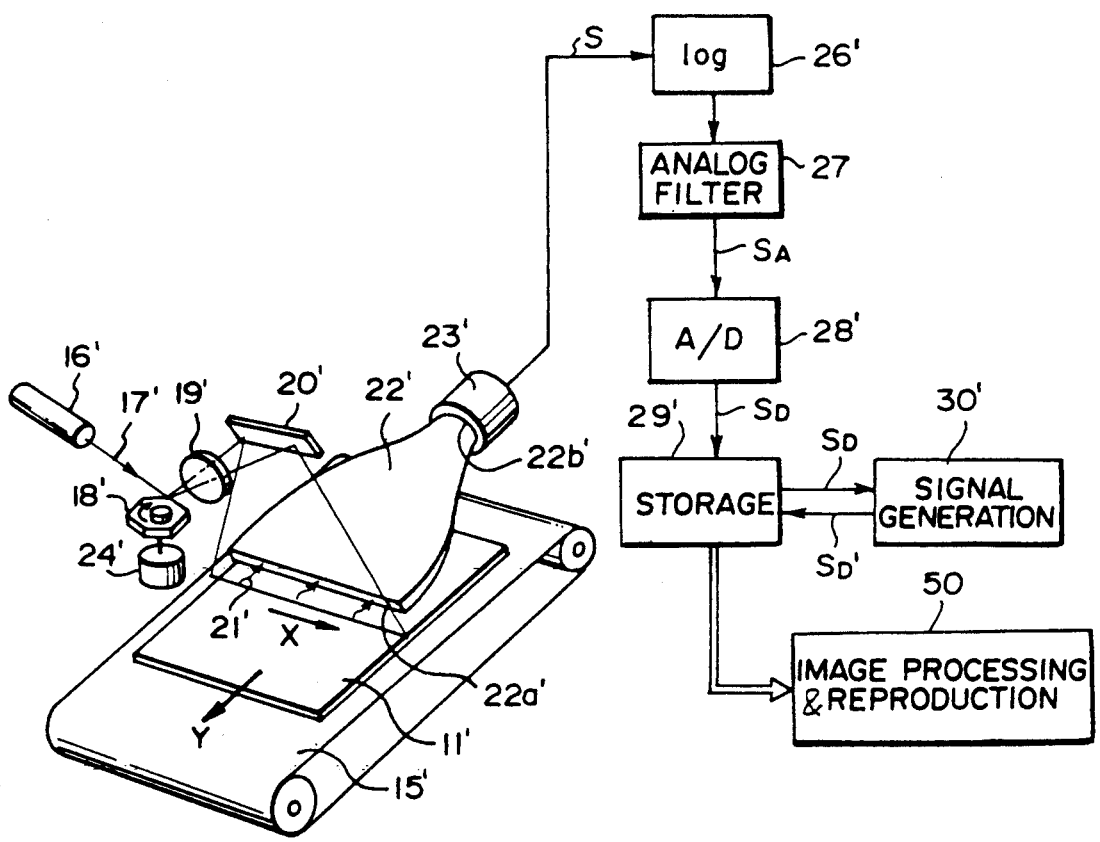
FIG. 6 is a perspective view showing an example of a radiation image read-out and reproducing apparatus wherein another embodiment of the method for generating a radiation image signal in accordance with the present invention is employed.

Another embodiment of the method for generating a radiation image signal in accordance with the present invention will be described hereinbelow. FIG. 6 is a perspective view showing an example of a radiation image read-out and reproducing apparatus wherein this embodiment is employed. Elements constituting the radiation image read-out and reproducing apparatus shown in FIG. 6 are basically equivalent to those constituting the radiation image read-out and reproducing apparatus shown in FIG. 1, and therefore numbered with corresponding primed reference numerals in FIG. 6.

An analog output signal S generated by a photomultiplier 23' is logarithmically amplified by a logarithmic amplifier 26', and the amplified analog output signal S is fed into an analog filter 27. The analog filter 27 processes the amplified analog output signal S comprising time-serial signal components detected along the main scanning direction indicated by the arrow X so that it transmits only the signal components falling in the spatial frequency region below the first spatial frequency fss and filters out the signal components falling in the spatial frequency region above the first spatial frequency fss. Therefore, an analog image signal SA fed out of the analog filter 27 does not include quantum noise components falling in the spatial frequency region above the first spatial frequency fss along the main scanning direction. Accordingly, in this embodiment, the method for generating a radiation image signal in accordance with the present invention is applied along only the sub-scanning direction indicated by the arrow Y.

In the same manner as that in the embodiment of FIG. 1, the analog image signal SA fed out of the analog filter 27 is sampled at predetermined sampling intervals and digitized by an A/D converter 28'. In this manner, a digital image signal SD (initial image signal) is obtained. The original image signal SD is stored in a storage means 29'.

Figure 7:
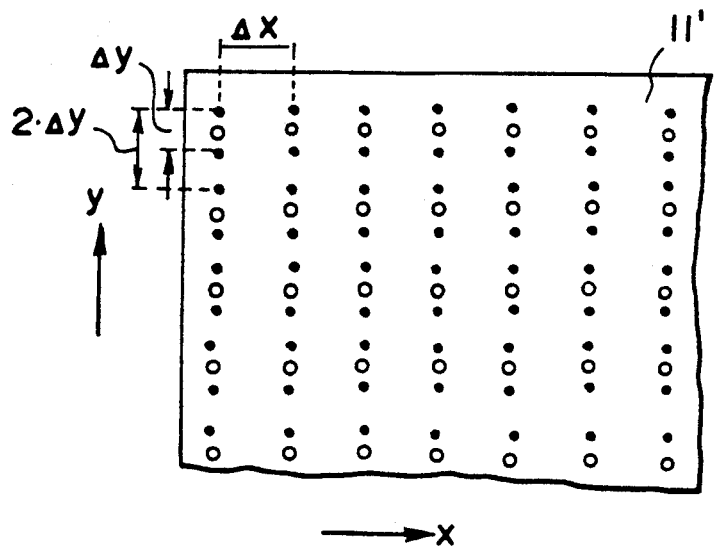
FIG. 7 is an explanatory view showing sampling points located on a stimulable phosphor sheet in order to explain how a further example of filtering processing is carried out.

FIG. 7 shows sampling points located on a stimulable phosphor sheet 11'. In FIG. 7, the horizontal direction (x direction) corresponds to the main scanning direction indicated by the arrow X in FIG. 6, and the vertical direction (y direction) corresponds to the sub-scanning direction indicated by the arrow Y in FIG. 6. Dots represent the sampling points from which the original image signal SD is sampled. As described above, analog filter processing has been carried out along the main scanning direction in order to eliminate quantum noise components falling in the spatial frequency region above the first spatial frequency fss. Therefore, in this embodiment, in order to obtain signal components of the original image signal SD along the main scanning direction, the analog image signal SA is sampled at sampling intervals $\Delta x = \frac{1}{2}fss$, corresponding to the first spatial frequency fss. In order to set the sampling intervals $\Delta x$, for example, the sampling time intervals in the A/D converter 28' shown in FIG. 6 are adjusted. In order to obtain signal components of the original image signal SD along the sub-scanning direction (y direction), the analog image signal SA is sampled at sampling intervals of $\Delta y = \frac{1}{2}fsw$, corresponding to the second spatial frequency fsw which is higher than the first spatial frequency fss (in this embodiment, fsw=2·fss). ($\Delta y = \frac{1}{2}\cdot fsw = \frac{1}{2}\cdot 2\cdot fss = \frac{1}{2}\cdot \Delta x$. Therefore, $\Delta x = 2\Delta y$). In order to set the sampling intervals along the sub-scanning direction, for example, the speed at which the stimulable phosphor sheet 11' is moved by a sheet conveyance means 15', shown in FIG. 6, is adjusted.

The original image signal SD, sampled from the analog image signal SA at the sampling points indicated by the dots in FIG. 7, is stored in the storage means 29' shown in FIG. 6, and is fed therefrom into an image signal generating means 30'. The image signal generating means 30' carries out filtering processing and resampling processing along the sub-scanning direction in the manner described below. Resampling processing is carried out in order to sample an image signal at sampling intervals corresponding to the first spatial frequency fss.

Figure 8:
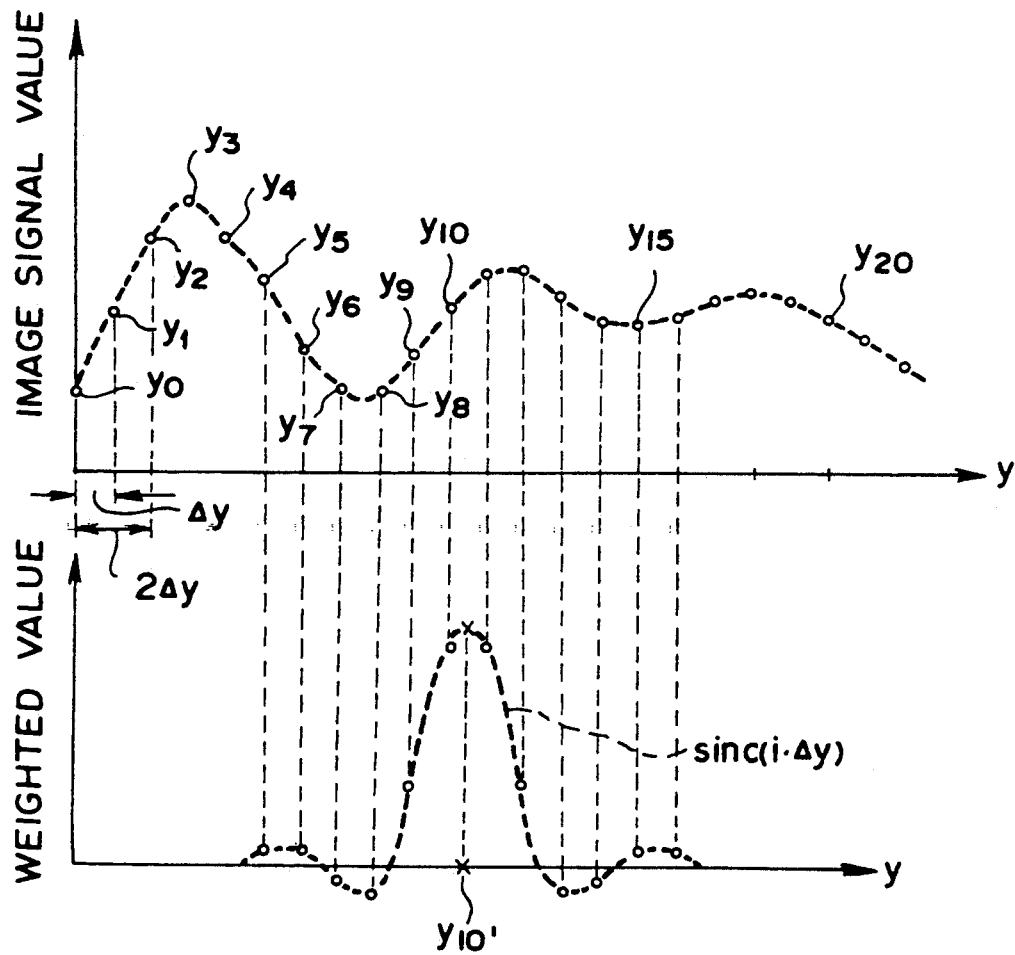
FIG. 8 is an explanatory view showing how filtering processing and resampling processing are carried out in an image signal generating means of the radiation image read-out and reproducing apparatus shown in FIG. 6.

FIG. 8 is an explanatory view showing how the filtering and resampling processing are carried out in the image signal generating means 30'.

In FIG. 8, yi (i=0, 1, 2, ...) denotes values of the original image signal SD at the sampling points located along the y direction (sub-scanning direction) shown in FIG. 7.

How the filtering processing of the original image signal SD is carried out in order to obtain an image signal y10', which corresponds to a sampling point located at the middle between the sampling points which in turn corresponds to the original image signal values y10 and y11, will be described hereinbelow. As shown in FIG. 8, the original image signal values at respective sampling points are weighted with a sinc function, and calculations, from the formula expressed as $$y10' = \sum_{i=-m+1}^{m} y10 + i \cdot \text{sinc}(i \cdot \Delta y) \quad (8)$$

where m is a predetermined positive integer, are carried out for the original image signal values y2xj (j=0, 1, 2, ...) which corresponds to alternate sampling points indicated by the circles in FIG. 7. Strictly speaking, the sinc function is continuous from $-\infty$ to $+\infty$. However, in this embodiment, because of required accuracy of calculations and the time taken for calculations, the value of m in Formula (8) is determined in advance.

Figure 9:
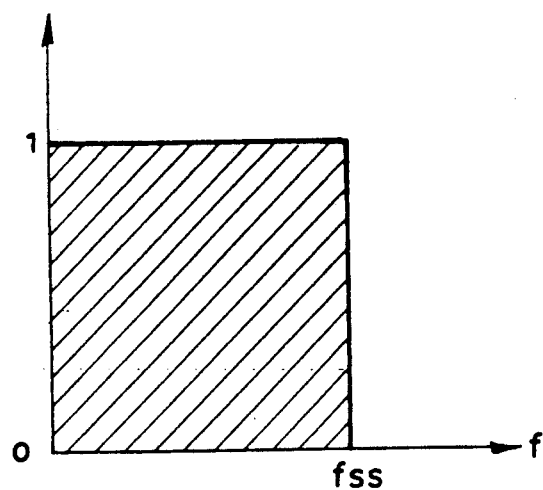
FIG. 9 is an explanatory view showing how filtering processing is carried out to transmit only the spatial frequency components below a first spatial frequency fss.

FIG. 9 is an explanatory view showing how the filtering processing is carried out to transmit only the spatial frequency components below the first spatial frequency fss.

The filtering processing shown in FIG. 8 is equivalent to the filtering processing shown in FIG. 9, wherein only the spatial frequency components below the first spatial frequency fss are extracted and the spatial frequency components above the first spatial frequency fss are filtered out. However, error does arise because, for example, the value m is finite and discrete values different by $\Delta y$ are used in the calculations. Therefore, in order to extract only the spatial frequency components below the first spatial frequency fss, the original image signal SD may be subjected to Fourier transformation, the filtering processing shown in FIG. 9 may be carried out, and then inverse Fourier transformation may be carried out.

In cases where the value m is set to 3 in Formula (8), the calculations are identical with the calculations from Formula (6), modified for one dimension.

The filtering and resampling processing were carried out with various filter functions in order to obtain image signals. The image signals were used to reproduce visible images, and the visible images were visually evaluated by five or six persons. The results are shown in Table 1.

TABLE 1

| Type of filter | Weight of mask | $\overline{R}$ | Visual evaluation |
|---|---|---|---|
| Elimination of high frequency region with Fourier transformation | | 0 | |
| Sinc-wise interpolation | $-\frac{2}{20}, \frac{3}{20}, \frac{9}{20}, \frac{9}{20}, \frac{3}{20}, -\frac{2}{20}$ | 0.27 | |

TABLE 1-continued

| Type of filter | Weight of mask | $\overline{R}$ | Visual evaluation |
|---|---|---|---|
| Interpolation of first order | $\frac{1}{2}, \frac{1}{2}$ | 0.37 | |
| Modified quadratic interpolation | $-\frac{1}{18}, \frac{10}{18}, \frac{10}{18}, -\frac{1}{18}$ | 0.56 | Δ~ |
| Quadratic interpolation | $\frac{3}{8}, \frac{6}{8}, -\frac{1}{8}$ | 0.68 | X~Δ |
| Thinning | 1 | 1 | X |

In Table 1, the weights of the masks (functions of the filters) are expressed as one-dimensional functions, for example, functions along only the main scanning direction.

When the high frequency region (above the first spatial frequency fss) is eliminated with Fourier transformation, the ideal filter shown in FIG. 9 can be realized, and the response mean value R is equal to zero. A visible image reproduced from an image signal obtained from this type of filtering processing has very good image quality though a comparatively long time is required for the filtering processing.

Sinc-wise interpolation corresponds to Formula (6) [m=3 in Formula (8)]. With sinc-wise interpolation, the response mean value $\overline{R0}$ is equal to 0.27, and a visible image having good image quality can be obtained.

Interpolation of first order corresponds to Formula (4). With the interpolation of first order, the response mean value $\overline{R0}$ is equal to 0.37, and a visible image having comparatively good image quality can be obtained though the image quality is slightly worse than with the sinc-wise interpolation.

With modified quadratic interpolation, quadratic interpolation, and thinning (wherein signal components are alternately thinned out), the response mean values $\overline{R0}$ are 0.56, 0.68, and 1 respectively, and the image quality deteriorates in this sequence. As is clear from Table 1, the quality of the visible image can be kept high when $\overline{R} \leq 0.6$. Table 1 shows the results of a visual evaluation of the visible images obtained from a two-dimensional filtering processing (i.e. along the main scanning direction and the sub-scanning direction). However, for example, along the main scanning direction, filtering processing of the analog image signal can be carried out as in the embodiment of FIG. 6. In such cases, the method for generating a radiation image signal in accordance with the present invention may be applied only along the sub-scanning direction. The method for generating a radiation image signal in accordance with the present invention need not necessarily be applied along two directions. When the method for generating a radiation image signal in accordance with the present invention is applied only along the sub-scanning direction, the condition $\overline{R} \leq 0.6$ should be satisfied along the sub-scanning direction. Also, good image quality can be obtained when the method for generating a radiation image signal in accordance with the present invention is applied along only one direction, with no processing carried out along the other direction. In cases where the filtering processing is carried out along said one direction so that the condition $\overline{R} \leq 0.6$ is satisfied, good effects of improving the image quality can be effected.

In the aforesaid embodiments, a spatial frequency two times as high as the first spatial frequency fss (a spatial frequency which is integral multiples of the first spatial frequency fss) is selected as the second spatial frequency fsw, and the filtering and resampling processing are carried out simultaneously. However, the second spatial frequency fsw need not necessarily be integral multiples of the first spatial frequency fss. Also, the filtering and resampling processing need not necessarily be carried out simultaneously.

In the aforesaid embodiments, stimulable phosphor sheets are used. However, the method for generating a radiation image signal in accordance with the present invention is widely applicable to systems wherein radiation image signals are detected from recording media having radiation images recorded thereon, for example, systems wherein X-ray image signals are detected from X-ray films having X-ray images recorded thereon.

We claim:

1. A method for generating a radiation image signal wherein a radiation image which has been recorded on a recording medium is read out at predetermined sampling intervals in order to obtain an image signal, the method for generating a radiation image signal comprising the steps of:
(i) in the course of said radiation image being read out, applying sampling intervals corresponding to a second spatial frequency fsw higher than a first spatial frequency fss, which is the maximum of a desired spatial frequency range, along at least one direction on said recording medium in order to obtain an original image signal,
(ii) subjecting said original image signal to filtering processing in order to transmit spatial frequency components below said first spatial frequency fss, and to reduce or eliminate spatial frequency components above said first spatial frequency fss, and
(iii) sampling the original image signal, which has been obtained from said filtering processing, at sampling intervals corresponding to said first spatial frequency fss in order to obtain an image signal.

2. A method as defined in claim 1 wherein, in cases where $|R(f)|$ denotes the absolute value of a complex response function R(f) wherein a spatial frequency f is a variable, and the complex response function R(f) is normalized so that it satisfies the condition expressed as $|R(0)|=1$ when f=0,
the complex response function R(f) satisfying the condition expressed as $\overline{R} \leq 0.6 \text{ k}$ wherein $\overline{R0}$ denotes a response mean value expressed as $$\overline{R} = \frac{\int_{fss}^{fsw} |R(f)| df}{\int_{fss}^{fsw} df}$$

is used in order to carry out said filtering processing along at least one said direction.

3. A method as defined in claim 1 or 2 wherein processing with an analog filter is applied along the other direction on said recording medium.

4. A method as defined in claim 1 wherein said recording medium is a stimulable phosphor sheet.

5. A method as defined in claim 4 wherein said original image signal is obtained from a read-out operation wherein said stimulable phosphor sheet is exposed to stimulating rays which cause it to emit light in proportion to the amount of energy stored during exposure to radiation, and the emitted light is detected photoelectrically.

6. A method as defined in claim 5 wherein said stimulating rays are a laser beam.

* * * * *